(12) United States Patent
Kaliski

(10) Patent No.: US 6,910,873 B2
(45) Date of Patent: Jun. 28, 2005

(54) SELF REGULATING ROTOR

(76) Inventor: Arthur Kaliski, P.O. Box 1513, Amagansett, NY (US) 11930

( * ) Notice: Subject to any disclaimer, the term of this patent is extended or adjusted under 35 U.S.C. 154(b) by 27 days.

(21) Appl. No.: 10/644,541

(22) Filed: Aug. 20, 2003

(65) Prior Publication Data

US 2005/0042095 A1 Feb. 24, 2005

(51) Int. Cl.⁷ .................................................. F03O 7/06
(52) U.S. Cl. ........................ 418/267; 418/268; 416/51; 416/89; 416/119; 416/169 R; 416/197 A
(58) Field of Search .............................. 416/44, 51–53, 416/87–89, 118, 119, 197 A, 169 R, DIG. 9; 418/267, 268

(56) References Cited

U.S. PATENT DOCUMENTS

| | | | |
|---|---|---|---|
| 1,646,673 A | 10/1927 | Wilson | |
| 1,697,574 A | 1/1929 | Savonius | |
| 1,766,765 A | 6/1930 | Savonius | |
| 1,836,693 A | * 12/1931 | Urfer | ........................ 416/119 |
| 2,007,963 A | * 7/1935 | Cleveland | ............... 416/197 A |
| 2,596,726 A | 5/1952 | Rydell | |
| 3,093,194 A | * 6/1963 | Rusconi | .................. 416/197 A |
| 3,942,909 A | 3/1976 | Yengst | |
| 4,004,861 A | * 1/1977 | Soules | ......................... 416/41 |
| 4,293,274 A | 10/1981 | Gilman | |
| 4,718,822 A | * 1/1988 | Riezinstein | ............. 416/197 A |

OTHER PUBLICATIONS

"Wind Energy Systems", paper presented at the Second International Symposium on Wind Energy Systems, Amsterdam, Netherlands, Oct. 3–6, 1978, vol. 2, pp. F3–30 to F3–34.*

* cited by examiner

Primary Examiner—Christopher Verdier

(57) ABSTRACT

A machine that is a self regulating rotor with a set of cups or vanes that are pivotally attached about a central axis such that they form a closed three dimensional shape when closed, and when rotated into an open orientation form an S-shaped rotor, when viewed as a horizontal cross section, a cup shaft to which each cup is attached, such that the cup can pivot or rotate from a closed shape to an open S-shaped rotor, end plates through which cup shafts are pivotally supported, a central shaft to which end plates are attached, a rotational energy connecting element attached to the cup shafts, that control rotation of cup shafts, a rotational speed sensor, and a braking device.

5 Claims, 6 Drawing Sheets

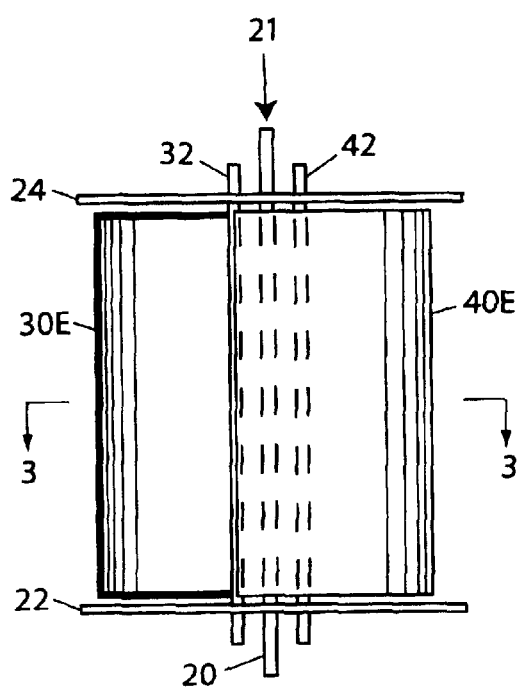
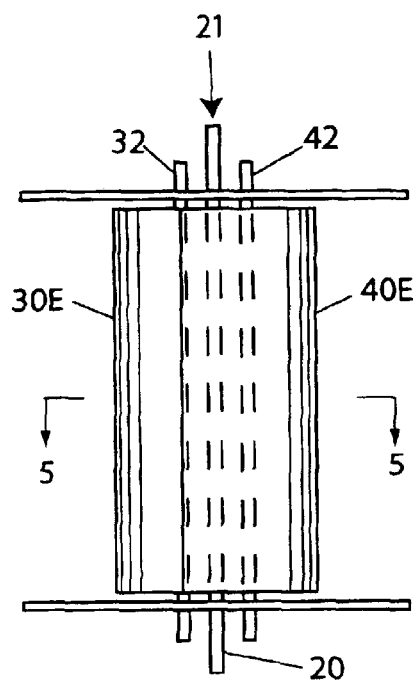
Fig 2
Fig 4
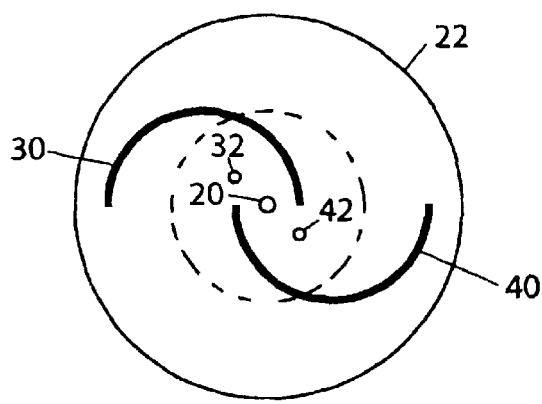
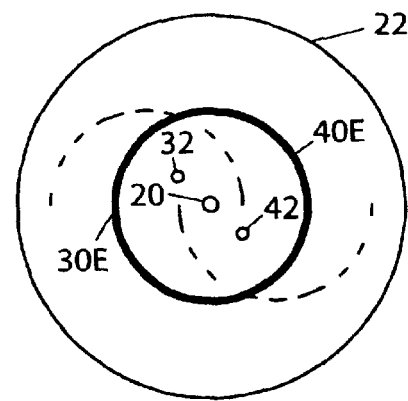
Fig 3
Fig 5

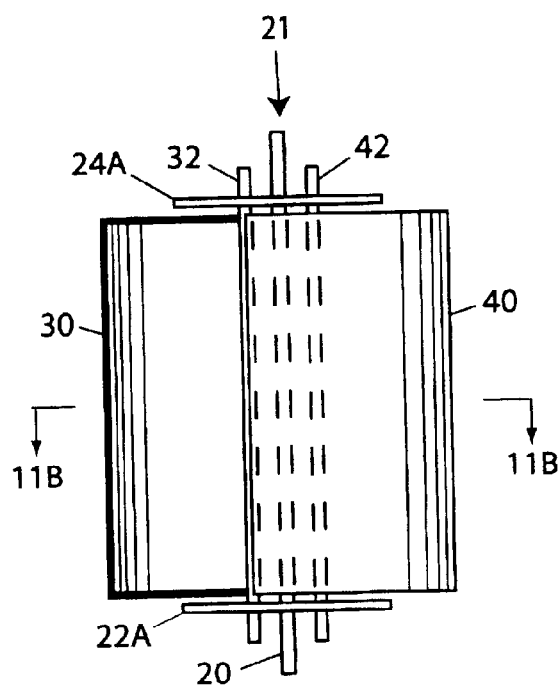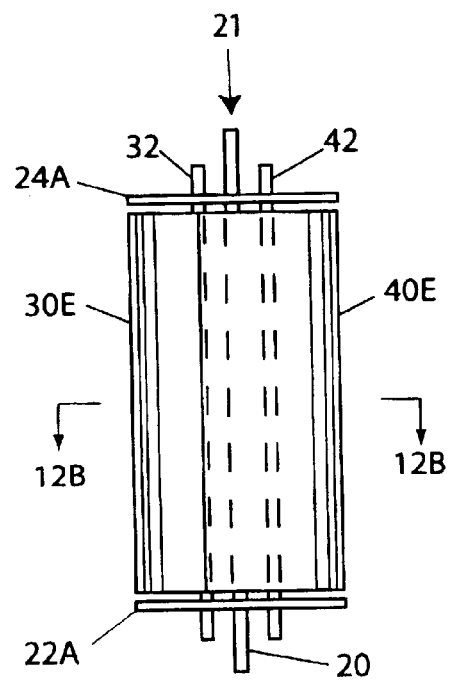
Fig 11    Fig 12
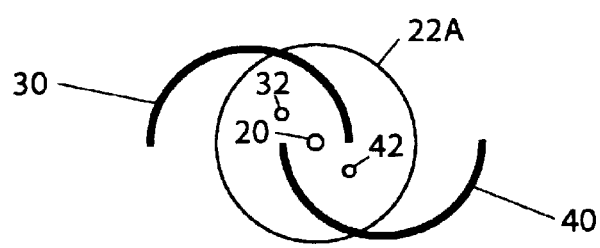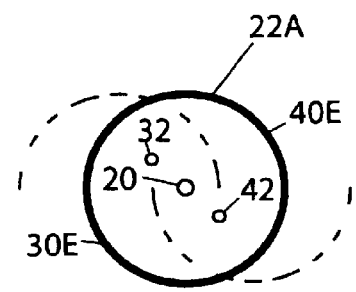
Fig 11B    Fig 12B

SELF REGULATING ROTOR

BACKGROUND OF THE INVENTION

This invention relates generally to the field of rotors and more specifically to a self regulating rotor.

Rotors, with both horizontally and vertically oriented axis, have been designed as windmills and wind turbines to capture energy from the wind. There is a great need for devices that can generate electricity from the energy in the wind. Windmill generated electricity can be stored in batteries. It can replace the need for communities in the third world to purchase kerosene for lighting. Wind generated electricity can also power ultra-violet water disinfection and purification systems which can give third world countries a source of clean drinking water. Windmill generated electricity is a non-polluting source of electricity, and will continue to find greater use through out the world.

Horizontal axis rotor designs have found greater acceptance than vertical axis rotors for use as windmill generators. Horizontal axis rotor wind mills are designed with two or more blades, attached to a rotor hub, similar to the propellers used on propeller driven aircraft. To capture the energy in the wind, horizontal axis rotors need mechanisms to keep their blades facing into the wind. They are designed to operate in environments where the wind is constant in direction and wind speed. Horizontal axis rotor wind mills rotating at high speeds generate strong gyroscopic forces that make them not suitable for use in turbulent winds, where the wind continually changes direction. Horizontal axis wind mills need specific conditions to operate effectively. Horizontal axis rotor wind mills will only operate in a limited range of wind speeds. Horizontal axis rotor windmills are placed on high towers where there is an undisturbed air flow. Horizontal axis rotor windmills are not designed to function well in the disturbed air flows that are found around buildings in cities and urban areas. Placement of propeller type horizontal axis rotor windmills has been resisted by communities because of their appearance and their need to be located on high towers. Horizontal axis rotor windmills need to be sited where the wind is of a minimum velocity and undisturbed to be practical. Horizontal axis rotor wind mills need complex control mechanisms to control their speed of rotation as well as to feather their blades in extreme conditions.

Vertical axis rotors differ from horizontal axis rotors in that they are able to function in wind conditions and site locations that are not practical for horizontal axis rotors windmills to operate in. Vertical axis rotors eliminate some of the problems associated with horizontal axis rotor units, making vertical axis rotors a good alternative to horizontal axis rotors. Vertical axis rotors do not need to continually orient themselves into the wind since their design allows them to accept wind from any direction. Vertical axis rotors can operate in disturbed, turbulent air flows. Vertical axis rotors will operate in a wider range of wind speeds and more varied wind conditions than horizontal axis rotors. Vertical axis rotor type wind mills have the ability to capture wind energy over a greater period of time, which can amount to the extracting of an equal or greater amount of energy from the wind than is captured with a horizontal axis rotor windmill. Vertical axis rotor windmills have inherent advantages of stability due to gyroscopic action of their rotors and simplicity of design due to the avoidance of yaw mechanisms and blade controls. Vertical axis rotors have been designed to increase the energy that can be captured from the wind. Vertical axis rotors that in cross section have the appearance of an S-shape are seen in prior art and will hereafter be referred to as S-shaped rotors.

An S-shaped rotor is disclosed in U.S. Pat. No. 1,646,673 to Wilson. Wilson discloses a vertical axis wind driven turbine windmill, manually adjusted that consists of a plural segmented cylindrical shaped construction, the segments of which may relatively be adjusted to provide an enclosed cylinder, or which may be laterally moved to provide vanes having various degrees of extension, allowing its drive shaft to rotate at varying speeds. In a fully opened configuration the segments form an S-shaped rotor.

In U.S. Pat. No. 1,697,574 to Savonius another vertical axis wind rotor is disclosed. The Savonius device comprises a rotor disposed on the vertical axis which has complementary vertically and longitudinally extending elements rotatable about an individual axis to define in horizontal cross section an essentially S-shaped configuration. This device known as the S-shaped rotor resembles the cylindrical rotor of professor Gustav Magnus and is distinguishable in that oppositely arranged complementary vanes overlap to define between them a centrally S-shaped air passage of consistent area, which Savonius found enhanced the speed and torque developed by the rotor. Among its advantages, the Savonius S-shaped rotor would operate in response to any wind movements, regardless of direction. In U.S. Pat. No. 1,766,765, Savonius provides an improved vertical axis wind turbine wherein he makes provisions for speed control means comprising movable flaps located in transverse relation on the complementary vanes to reduce the speed of rotation of the rotor member during excessive wind movement and velocity.

In U.S. Pat. No. 2,596,726 to Rydell, another vertical axis type wind turbine is shown having telescoping and complementary semicircular elements which are respectively curved and capable of lateral displacement with respect to each other to define the S-shaped rotor in operation. Rydell relies on a rack and pinion linkage for the lateral adjustment of his vanes.

U.S. Pat. No. 3,093,194 to Rusconi also relates to a vertically disposed wind motor having a plurality of vertically disposed curved air foils and which are pivotally linked with respect to each other to define in one configuration an approximate S-shaped rotor. Rusconi controls the speed and energy developed by his device by coiled torsion springs for resisting the relative outward movement of the respective vanes during operation of the device. The spring tends to bring the blades into a configuration promoting the S-shape which optimizes operations of the device.

In U.S. Pat No. 3,942,909 to Vengst, Vengst discloses a vertical axis wind driven rotor having hinged vanes which rotate on individual axis to move from the closed position in which they form a cylinder to open position defining the S-shaped rotor similar to Savonius where the movement of fluid is used to control and regulate a rotors speed of rotation.

And finally in U.S. Pat. No. 4,293,274 Gilman discloses a helically shaped vertical axis S-shaped rotor that regulates its speed of rotation by lateral movements of its vanes from a closed cylinder to open S-shaped rotor through the use of extensive linkages.

Vertical axis S-shaped rotor designs should take advantage of their inherent beneficial characteristics over horizontal axis windmills. They should be adaptable to varying weather and wind conditions and be of a simple design. They should take advantage of their high starting torque at low wind speeds, as well as more aerodynamically efficient shapes in higher wind speeds. They should be able to close into a closed shape to protect them from severe conditions. And finally they should take advantage of rotary movements to facilitate any changes to their shape.

The prior art rotors suffer in at least one respect. For example, Wilson's U.S. Pat. No. 1,646,673 wind turbine is not automatically adjustable and uses a design of laterally shifting paired vanes to change exposed area to the wind. The S-shape is only established when the rotor is totally open. In Savonius's first U.S. Pat. No. 1,697,574, the design cannot close into a closed cylinder. In Savonius's second U.S. Pat. No. 1,766,765, fixed vanes with flaps are used to regulate speed of rotation. This design also cannot close into a cylinder or change vane overlap. Rydell, U.S. Pat. No. 2,596,726, discloses rotors designed for ship propulsion. The rotor described by Rydell uses a relatively complex rack mechanism to cause lateral movements of its vanes and to change vane overlap. Rusconi U.S. Pat. No. 3,093,194 allows its vanes to swing outwardly to control its speed of rotation, losing the S-shape configuration in the process. Vengst's U.S. Pat. No. 3,942,909 uses fluid to control and regulate a rotors speed of rotation. The mass of the fluid increases the rotors inertia and results in a rotor that will not start turning as easily as a rotor without the mass of fluid. Gilman U.S. Pat. No. 4,293,274 uses extensive linkages to facilitate the lateral movements of vanes from a closed cylinder to a S-shape rotor. Finally all of the foregoing devices have relatively complex construction which are expensive to assemble and maintain.

OBJECTS AND SUMMARY OF THE INVENTION

The primary object of the invention is to provide a rotor that will change into aerodynamically efficient shapes that will best match the conditions the rotor is operating in.

Another object of the invention is a simple designed rotor that will change its shape to best match changing wind speeds and weather conditions.

Another object of the invention is a rotor that adjusts cup or vane overlap to optimize the energy it can extract from the wind.

A further object of the invention is a rotor that protects itself from extreme weather and high winds speeds by rotating into a closed shape.

Yet another object of the invention is a rotor of simple design, with few moving parts, which lowers its cost of manufacture as well as increase the rotors dependability.

Still yet another object of the invention is a rotor that will operate in turbulent air flows.

Another object of the invention is a rotor that will accept wind from any direction, it does not need to orient itself into the direction the wind is coming from.

Another object of the invention is a rotor that will operate over greater wind speed ranges and weather conditions then horizontal propeller type turbines.

A further object of the invention is a rotor that has high starting torque.

Yet another object of the invention is a rotor design that generates low noise levels when operating.

Still yet another object of the invention is to provide a low noise rotor that will operate in the disturbed air found around buildings and trees, ideally suited for used in urbane and populated areas.

Another object of the invention is a rotor that will operate in moving fluids, such as in rivers or in ocean currents.

In accordance with a preferred embodiment of the invention, there is disclosed a machine that is a self regulating rotor comprising: a set of cups or vanes that are pivotally attached about a central axis such that they form a closed three dimensional shape when closed, and when rotated into an open orientation form an S-shaped rotor, when viewed as a horizontal cross section; a cup shaft to which each cup is attached, such that the cup can pivot or rotate from a closed shape to an open S-shaped rotor; end plates through which cup shafts are pivotally supported; a central shaft to which end plates are attached; a rotational energy connecting element attached to said cups shafts, that controls rotation of cup shafts; a rotational speed sensor, which measures the speed of rotation of the central shaft and having corresponding controllers to affect rotational changes in rotor cup shafts and cups to suite any specific situation or need; and a breaking device attached to the rotor that will slow the rotation of the rotor or hold the rotor stationary.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 2 is a front view of my invention in an open position.

FIG. 3 is a view in detail of the portion indicate by the section lines 3—3 in FIG. 2.

FIG. 4 is a front view of my invention in a closed position.

FIG. 5 is a view in detail of the portion indicated by the section lines 5—5 in FIG. 4.

FIG. 11 alternative embodiment,cups in open position, end plates diameter equal to or less than diameter of closed cup shape.

FIG. 11B is a view in detail of the position indicated by the section lines 11B—11B in FIG. 11.

FIG. 12 alternative embodiment,cups in closed position, end plates diameter equal to or less than diameter of closed cup shape.

FIG. 12B is a view in detail of the position indicated by the section lines 12B—12B in FIG. 12.

FIG. 15A is a view in detail of the position indicated by the section lines 15A—15A in FIG. 15.

FIG. 16A is a view in detail of the position indicated by the section lines 16A—16A in FIG. 16.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
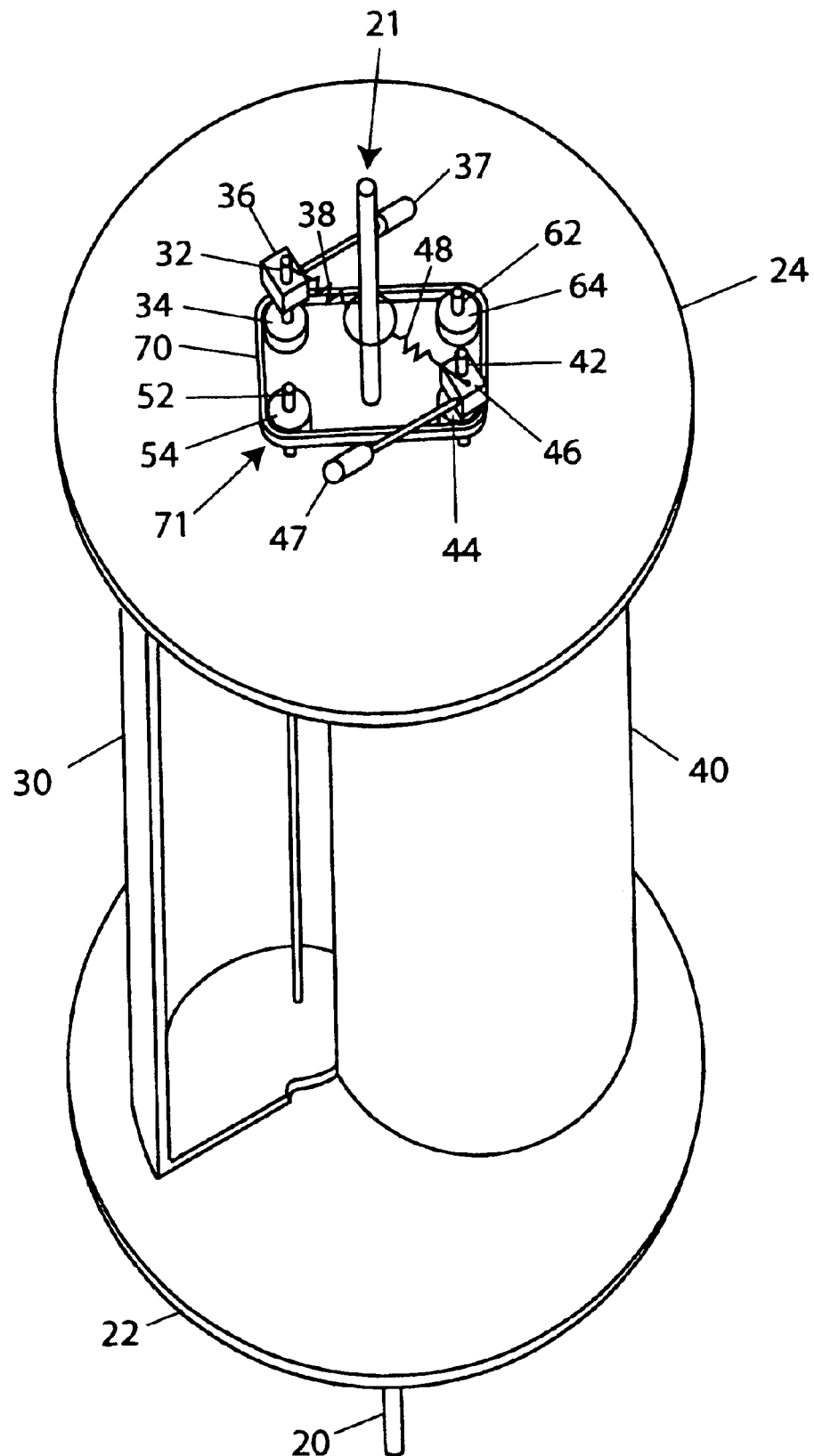
FIG. 1 is a perspective view of my invention.
Figure 7:
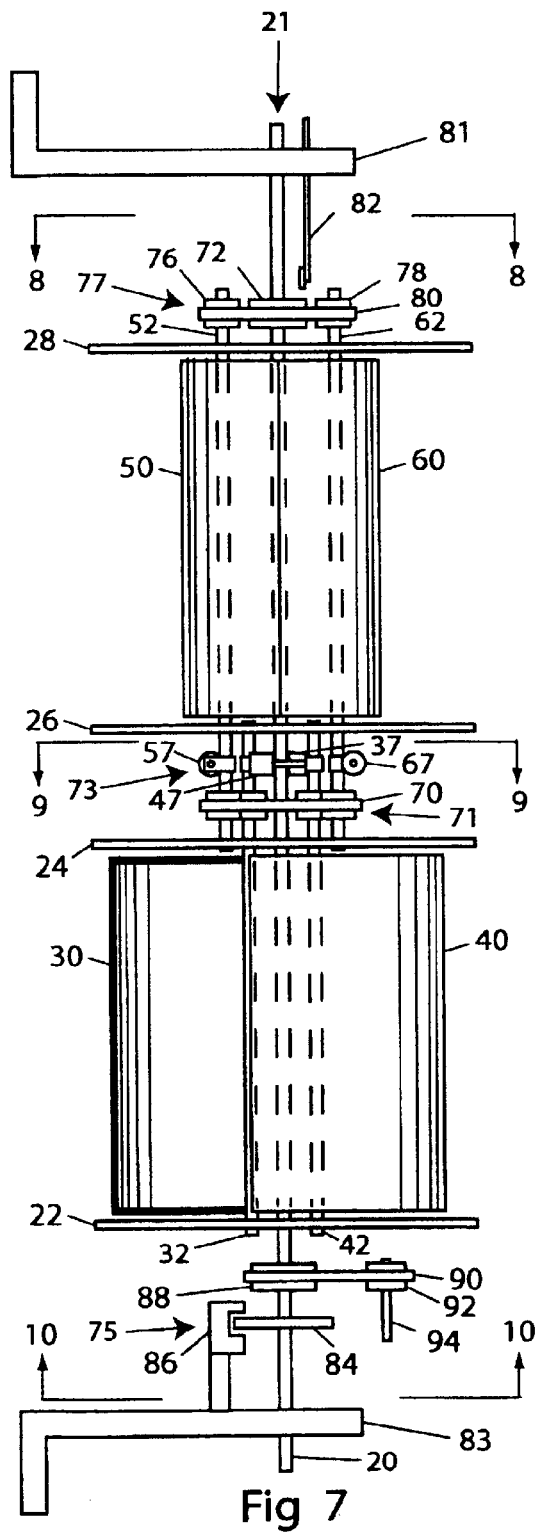
FIG. 7 is a front view of two rotor sections, one on top of the other.

A preferred embodiment of the present invention is illustrated in FIG. 1 and FIG. 7. FIG. 1 shows a perspective view of a single rotor section and FIG. 7 shows a front perspective view of a two rotor section assembly. It is understood that the word cups in the specifications can also include vanes. We define a cup to include a vane.

In FIG. 1 a set of cups 30 and 40 are pivotally attached about a central axis 21, such that they form a closed three dimensional shape when rotated into a closed orientation (FIG. 5), and when rotated into an open orientation form an S-shaped rotor when seen from a horizontal cross section (FIG. 3). A central axis 21, is defined as the center of rotation of a central main shaft.

FIG. 1 shows a set of cups 30 and 40, that are attached to cup shafts 32 and 42, such that cups 30 and 40 can be pivoted from a closed shape (FIG. 5), to an open S-shape rotor (FIG. 3). Cup shafts 32 and 42 are pivotally attached to endplates 22 and 24. End plates 22 and 24 are attached to a central main shaft 20. A rotational energy connecting element 71, controls the simultaneous rotation of cup shafts. A rotational energy connecting element 71, is shown consisting of a timing belt 70, and timing pulleys 34, 44, 54 and 64 which are connected to cup shafts 32, 42, 52 and 62. Rotational speed sensors 73, are shown as lever arms 36 and 46 with their corresponding weights 37 and 47 and springs 38 and 48 which are attached to cup shafts 32 and 42 respectively.

FIG. 7 shows one set of cups 30 and 40 attached to cup shafts 32 and 42. Cup shafts 32 and 42 are pivotally attached to end plates 22 and 24. End plates 22 and 24 are attached to a central main shaft 20. FIG. 7 shows a second set of cups 50 and 60 attached to cup shafts 52 and 62. Cup shafts 52 and 62 are pivotally attached to end plates 26 and 28, such that cups 50 and 60 can be pivoted from a closed shape to an open S-shape rotor. End plates 26 and 28 are attached to a central main shaft 20 such that they are rotated ninety degrees form the lower set of end plates 22 and 24. A rotational energy connecting element 71, is located between end plates 24 and 26 and is shown (FIG. 1), consisting of a timing belt 70, and timing pulleys 34, 44, 54 and 64 which are connected to cup shafts 32, 42, 52 and 62. Rotational speed sensors 73, are located between end plates 24 and 26 and are shown (FIG. 9) as lever arms 36, 46, 56 and 66 with their corresponding weights 37, 47, 57 and 67 which are attached to cup shafts 32, 42, 52 and 62 respectively.

Figure 9:
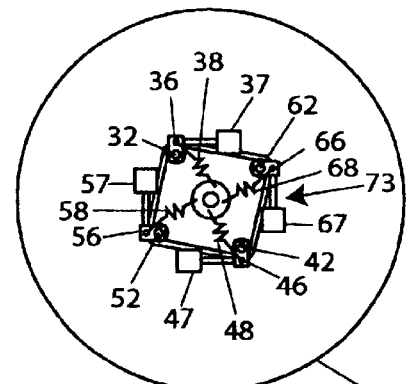
FIG. 9 is a view in detail of the position indicated by the section lines 9—9 in FIG. 7.

FIG. 9 shows view in detail of position line 9—9 in FIG. 7 of rotational speed sensors 73. Rotational speed sensors 73, are shown as lever arms 36, 46, 56 and 66 with their corresponding weights 37, 47, 57 and 67 and springs 38, 48, 58, and 68 which are attached to cup shafts 32, 42, 52, and 62 respectively.

Figure 10:
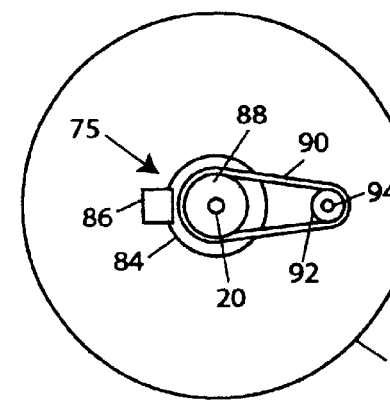
FIG. 10 is a view in detail of the position indicated by the section lines 10—10 in FIG. 7.

FIG. 7 and FIG. 10 show a braking device 75, made up of a brake disk 84 attached to the central main shaft 20, and a brake caliper 86 attached to the lower rotor support 83.

In FIG. 7 and FIG. 10 a central main shaft pulley 88 is attached to the central main shaft 20. A v-belt 90 connects the central main shaft pulley 88 to a drive pulley 92. Drive pulley 92 is attached to a drive pulley shaft 94.

Figure 8:
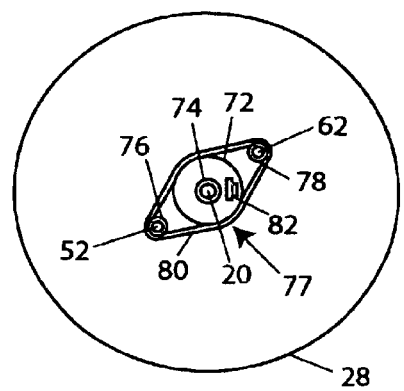
FIG. 8 is a view in detail of the position indicated by the section lines 8—8 in FIG. 7.

FIG. 7 and FIG. 8 show a rotor clutch assembly 77, made up of a main shaft clutch pulley 72 and its bearing 74, two cup shaft clutch pulleys 76 and 78 and a connecting v-belt 80. The central main shaft clutch pulley 72 and its bearing 74 are located above upper end plate 28. The central main shaft clutch pulley bearing 74 is attached to the central main shaft 20. Two cup shaft clutch pulleys 76 and 78 are attached to cup shafts 52 and 62 above end plate 28. Central main shaft clutch pulley 72 is connected by a v-belt 80, to the two cup shaft clutch pulleys 76 and 78. A clutch friction wheel 82 is located above the central main shaft clutch pulley 72. The clutch friction wheel 82 is supported to the upper rotor supporting structure 81.

The present invention provides a vertical axis S-shape rotor that uses rotary movements of its cups to change from a closed shape to a fully open S-shape rotor. The invention is capable of moving its cups into aerodynamically efficient orientations that will best match the wind speed and conditions. The simple design allows the S-shape rotor to change rotational speeds, by reducing or increasing cup area exposed to the wind. A closed shape facilitates stopping or breaking of the rotor, and also protects the rotor in severe wind conditions.

The Operation of My Invention is as Follows.

In FIG. 1, FIG. 3 and FIG. 7 cups 30 and 40 are in an open orientation. The S-shape rotor relationship catches the wind resulting in rotation of the rotor. Wind enters the inside of cup 30 and then is redirected to the inside of cup 40. The forces created by air moving against and around cups 30 and 40 is carried through their cup shafts 32 and 42 to the upper and lower end plates 22 and 24. End plates 22 and 24 are connected to the central main shaft. The central main shaft receives the torque generated by cups 30 and 40.

In FIG. 7 a second rotor assembly is stacked above the first, with the upper rotor rotated 90 degrees relative to the lower. Upper rotor cups 50 and 60 are also in an open orientation, S-shape relationship, that catches the wind energy and delivers torque through their cup shafts 52 and 62 to their upper and lower end plates 26 and 28, which are connected to the main shaft 20. The rotor cups are able to change their relative orientations into the most aerodynamically desirable configurations that will best suit any particular condition the rotor is operating in. Rotor cups may take their shapes from segments of three dimensional forms such as cylinders, spheres, cones or free form shapes. It is understood that the word cups in the specifications can also include vanes.

In an open S-shaped orientation the cups have their greatest area exposed to the wind and produce their highest starting torques.

Figure 6A:
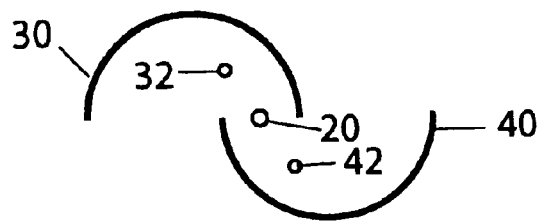
FIG. 6A is a top view of cups in open position.
Figure 6B:
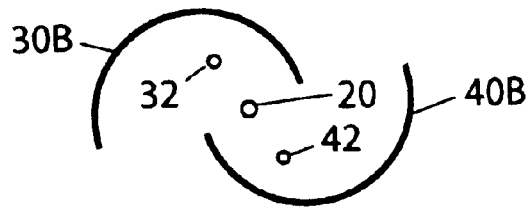
FIG. 6B is a top view of cups at a 50% overlap.
Figure 6C:
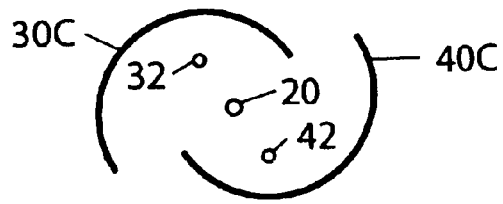
FIG. 6C is a top view of cups at a 65% overlap.
Figure 6D:
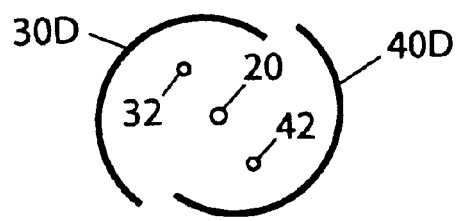
FIG. 6D is a top view of cups at a 88% overlap.
Figure 6E:
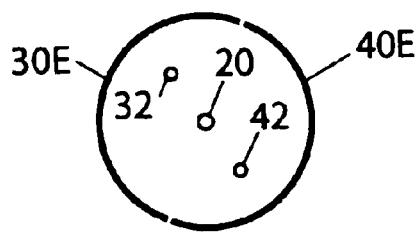
FIG. 6E is a top view of cups in a closed position, 100% overlap.

As the wind increases, the rotor's rotational speed increases. Rotational speed sensors 73, located on the rotor, respond to the increase in rotational speed by rotating cup shafts and the cups attached to the shafts into orientations that best suite conditions and wind speeds the rotor is operating in. In FIG. 6A cups 30 and 40 are shown in a fully open S-shape orientation. As the wind speed increases, the rotor's rotational speed increases. The rotational speed sensor 73, responds by rotating the cup shafts 32 and 42 resulting in less exposed cup area to the wind. FIG. 6B, FIG. 6C and FIG. 6D show increased cup shaft rotation and the closing of the cups. In FIG. 6E the cups are rotated into a closed form, with little or no exposed area to catch the wind.

Examples of rotational speed sensors 73, are shown in FIG. 7 and FIG. 9 represented by lever arms 36, 46, 56, and 66 with their respective weights 37, 47, 57, and 67, which are attached to cup shafts 32, 42, 52, and 62, as well as springs 38, 48, 58, and 68.

As the rotational speed of the rotor increases the lever arm weights 37, 47, 57, and 67, swing outward from the center of rotation, against the spring tension. The outward movement of the lever arms rotates the cup shafts 32, 42, 52, and 62 and reduces the exposed area to the wind of the cups 30, 40, 50, and 60. As the wind speed lessens, the rotor's rotational speed lessens, spring tension pulls the lever arms back toward the center of rotation, and the cups open up. Rotational speed sensors can take the form of any mechanical, electrical, hydraulical, pneumatical or optical device that will measure the speed of rotation of the central shaft and have corresponding controllers to affect rotational changes in the rotor cup shafts and cups to suite any specific situation or need. In FIG. 7 and FIG. 9 a rotational connecting element 71, consisting of timing pulleys 34, 44, 54, 64, and a timing belt 70, is shown that connects the rotational movements of cup shafts of the upper and lower rotor sections. Timing pulleys 34, 44, 54, and 64 are attached to cup shafts 32, 42, 52, and 62. Timing pulleys 34, 44, 54, and 64 are rotationally connected with a timing belt 70. Other rotational connecting elements may be used including mechanical linkages, chain and sprocket, electrical, hydraulical, pneumatical devices that will result in coordinated rotary movements of cup shafts and cups.

In an alternative embodiment, a rotor clutch 77, can be used to close the rotor cups of a rotating rotor.

FIG. 7, and FIG. 8 show the central main shaft clutch pulley 72 mounted on a central main shaft clutch pulley bearing 74, which is mounted onto the central main shaft 20. Pulley 72 rotates independent of the central main shaft 20. The central main shaft clutch pulley 72 rotates with the upper end plate 28. The main shaft clutch pulley 72 is connected by way of a v-belt 80, to clutch pulleys 76 and 78 that are attached to cup shafts 52 and 62. When the rotor clutch is not actuated, the rotation of cup shafts 52 and 62 are controlled by the rotational speed sensors 73, and the rotational connecting elements 71. To close a rotating rotor into a closed shape, FIG. 4, FIG. 5, FIG. 6E, a clutch friction wheel 82, FIG. 7 and FIG. 8, which is attached to the upper rotor support 81, puts pressure on the central main shaft clutch pulley 72.

The central main shaft clutch pulley 72 rotation is slowed compared to the upper end plate 28. The v-belt 80 directs resistance against clutch pulleys 76 and 78. As the upper end plate 28 rotates, clutch pulleys 76 and 78 are held by the v-belt 80, resulting in the rotary movements of cup shafts 52 and 62. As cup shafts 52 and 62 rotate, their corresponding attached cups 50 and 60 rotate into a closed shape. The rotational connecting element 71, timing belt 70, connecting the rotation of all four cup shafts 32, 42, 52 and 62, result in the closing of cups 30 and 40. The closed shapes have little or no exposed areas to the wind.

FIG. 7 and in FIG. 8 show a disk brake 75, made up of a break desk 84 that is attached to the central shaft 20, and a brake caliper 86 that is attached to a lower rotor support 83. To stop the rotation of the rotor and hold the rotor in a stationary position, the brake caliper 86 is actuated, putting pressure on the break disk 84, which slows and stops main central shaft 20.

Description and Operation of Alternative Embodiments

FIG. 11, FIG. 12 show another embodiment of my invention, where the diameter of the end plates 22A and 24A are equal or less than the diameter of the closed shape. This embodiment results in a total closed shape, FIG. 12 and FIG. 12B, without end plates extending beyond the edge of the closed shape. In this embodiment, the closed shape has less projections to be exposed to wind and weather such as freezing rain, ice and snow. The closed shape, because of its shape and form, are easily adaptable to populated areas, where the public's main opposition to windmill sighting has been safety and appearance.

Figure 13:
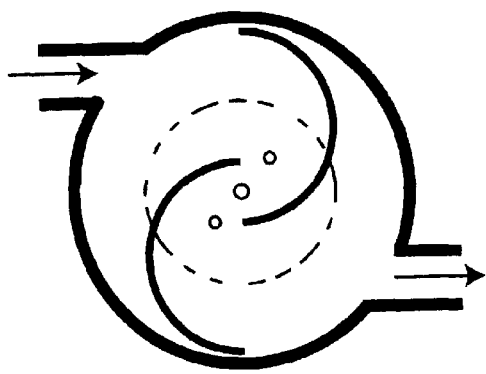
FIG. 13 alternative embodiment, rotor enclosed in housing, cups in open position.
Figure 14:
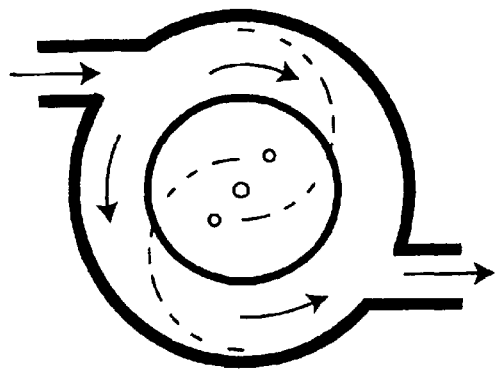
FIG. 14 alternative embodiment, rotor enclosed in housing, cups in closed position.

FIG. 13 and FIG. 14 shows another embodiment of my invention where the rotor is enclosed in a housing through which air or fluid passes. In a close shape orientation, FIG. 14, air or fluid can pass unobstructed past the rotor. The rotor in an open orientation, FIG. 13, energy can be passed to or taken from the fluid or air in the enclosed housing, allowing the rotor to act as a pump or a motor.

Figure 15:
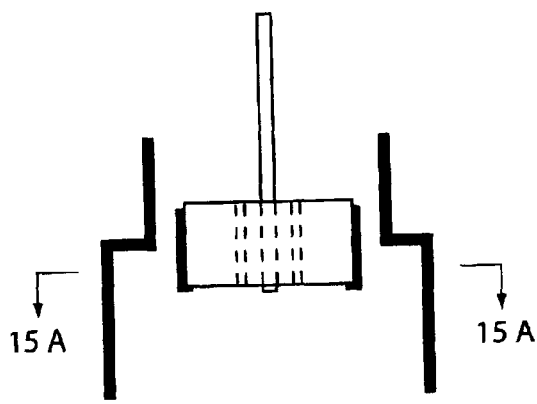
FIG. 15 alternative embodiment, rotor in closed position, rotor carrying tools, rotor can change diameter.
Figure 16:
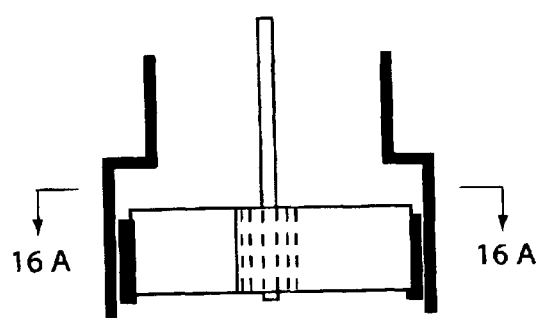
FIG. 16 alternative embodiment, rotor in open position, rotor carrying tools, rotor can change diameter.
Figure 15:
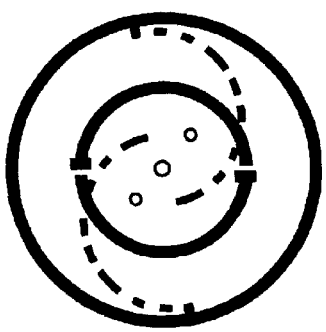
Figure 16:
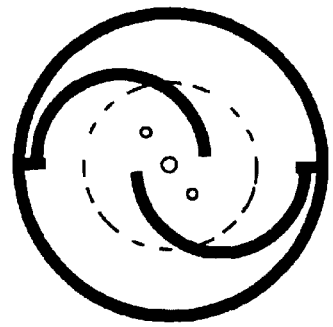

FIG. 15 and FIG. 16 show another embodiment of my invention where cutting or scraping blades or other tools are attached to the outer edge of the cups. In a close shape orientation, FIG. 15 and FIG. 15A, the tool carrying rotor can enter pipes or tubes or entrances of smaller diameter than the areas where the tools are to be used. Entering the location where the tools will be used, the tool carrying rotor has a closed shape of small diameter. To engage the tools with the surface, the tool carrying rotor cups rotate outward, FIG. 16 and FIG. 16A, to increase the diameter to what is needed. Cups when used as a tool or tool carrier can take their shapes from segments of three dimensional solid forms.

The central rotor shaft 20 can be a hollow axle shaft that rotates on a stationary supporter shaft. This allows for the support or mounting of the rotor from one end. The rotor can be carried by any rigid central support such as a communication tower lamppost flagpole or the top of bridges and buildings etc.

For the use as a starting rotor for various types of vertical axis wind turbines that are not self starting such as the Darius type. To start the Darius, rotor cups would establish themselves in an open configuration, FIG. 6A. After the Darius had started, the rotor cups would move into the orientation of a close shape, FIG. 6E, which would minimize drag and wind resistance for the Darius rotor.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A self regulating rotor comprising:
   two cups that are each pivotally attached about a central axis such that they form a three dimensional shape when closed, and when rotated into an open orientation form an S-shaped rotor, when viewed as a horizontal cross section;
   a cup shaft attached to each cup such that the cups can rotate from a closed shape to an open S-shaped rotor;
   an end plate attached to each end of the cup shafts, wherein said cup shafts are pivotally supported by said end plates;

a central shaft connecting said end plates on said central axis;

a rotational energy connecting element attached to said cup shafts, for controlling simultaneous rotation of said cup shafts, a rotational speed sensor connected to said rotational energy connecting element for sensing the speed of rotation of said central shaft and for activating said rotational energy connecting element to rotate said cup shafts in response to changes in said sensed speed of rotation of said central shaft; and a clutch system attached to the rotor, with the clutch system comprising pulleys connected to the cup shafts, with the clutch system using the rotational energy of the rotating rotor to close the rotor cups into the closed shape.

2. A rotor according to claim 1, further comprising a housing enclosing said self regulating rotor, said housing having intake and output openings.

3. A rotor according to claim 1, wherein said rotor has an adjustable diameter.

4. A rotor according to claim 1, wherein said central shaft is hollow.

5. A rotor according to claim 1, further comprising a braking device attached to the rotor, for slowing the rotation of the rotor.

* * * * *